April 24, 1956 R. J. VAN SCHIE Re. 24,145

METAL SHEET TRANSFER DEVICE

Original Filed May 13, 1954 3 Sheets-Sheet 1

INVENTOR.
Robert J. Van Schie
BY Otto A. Earl
ATTORNEY.

METAL SHEET TRANSFER DEVICE

Original Filed May 13, 1954 3 Sheets-Sheet 2

INVENTOR.
Robert J. Van Schie
BY Otto A. Earl
ATTORNEY.

April 24, 1956 R. J. VAN SCHIE Re. 24,145

METAL SHEET TRANSFER DEVICE

Original Filed May 13, 1954 3 Sheets-Sheet 3

INVENTOR.
Robert J. Van Schie
BY Otto A. Earl
ATTORNEY

United States Patent Office

Re. 24,145

Reissued Apr. 24, 1956

24,145

METAL SHEET TRANSFER DEVICE

Robert J. Van Schie, Grand Rapids, Mich.

Original No. 2,723,022, dated November 8, 1955, Serial No. 429,471, May 13, 1954. Application for reissue February 6, 1956, Serial No. 563,832

14 Claims. (Cl. 198—218)

Matter enclosed in heavy brackets [ ] appears in the original patent but forms no part of this reissue specification; matter printed in italics indicates the additions made by reissue.

This invention relates to improvements in metal sheet transfer device.

The principal objects of this invention are:

First, to provide a novel device for translating flat metal sheets edgewise between two or more positions, which device has spring actuated grippers for securely holding the sheets during movements thereof.

Second, to provide a sheet transfer device having a reciprocal carriage with spring biased grippers for holding metal sheets during movement, the grippers being automatically disengaged from the sheet as the sheet is brought into its discharge position.

Third, to provide a novel form of gripper for a sheet transfer device having novel locking and unlocking mechanism for the gripper.

Fourth, to provide a novel form of carriage for a sheet transfer device having simplified means for elevating and lowering the sheet gripper jaws carried by the carriage.

Other objects and advantages of the invention will be apparent from a consideration of the following description and claims.

The drawings, of which there are three sheets, illustrate a highly practical form of the transfer device and two forms of gripping elements that function in the device.

Figure 1:
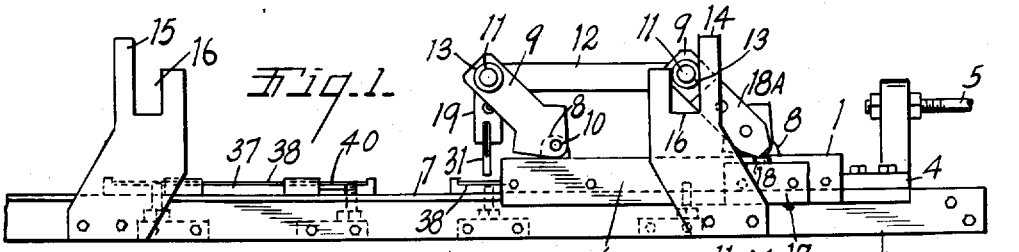
Fig. 1 is a side elevational view of the sheet transfer device in advancing position corresponding to the delivery position for sheets being advanced.
Figure 2:
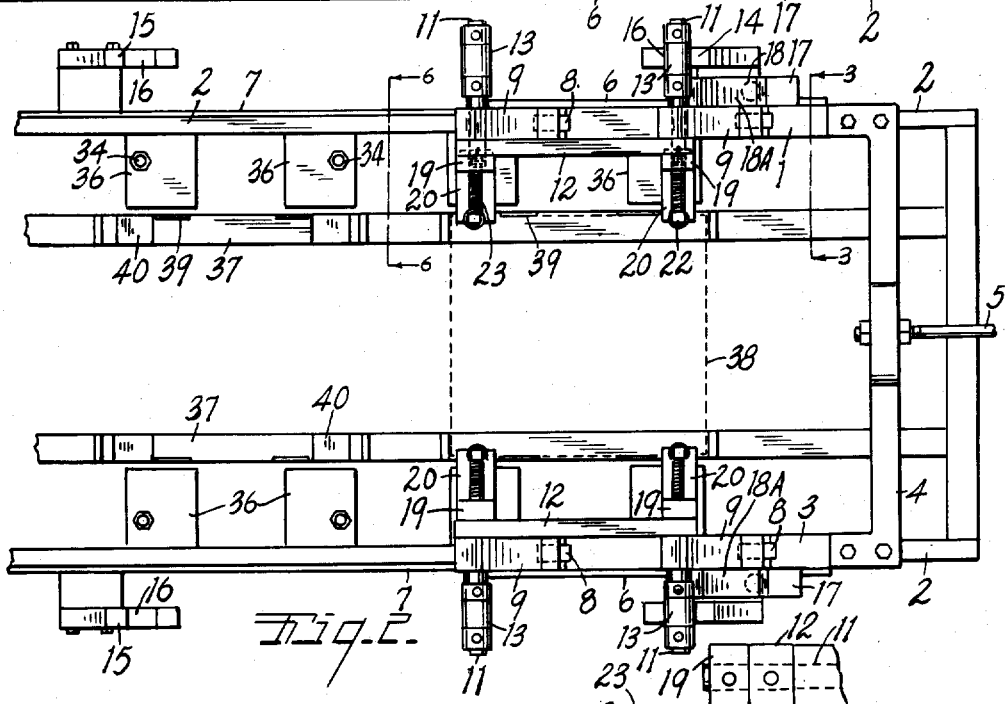
Fig. 2 is a plan view of the device in the same position as Fig. 1.

The sheet transfer device embodying the present invention may be used in any situation in which it is desired to transfer stiff sheets such as metal plates from one position to another with the sheets disposed in flat horizontal position. Without illustrating such a situation it is pointed out that the two positions of the sheet may be the beds of adjacent presses adapted to operate on the sheet when it is in each position. In order to translate the sheets between adjacent supports or positions, the invention embodies a carriage 1 reciprocably supported on guide rails 2. The carriage includes side members 3 which are supported on sides along the rails 2 and a cross member 4 to which a drive rod 5 may be connected from any suitable source of power for reciprocating the carriage.

Figure 3:
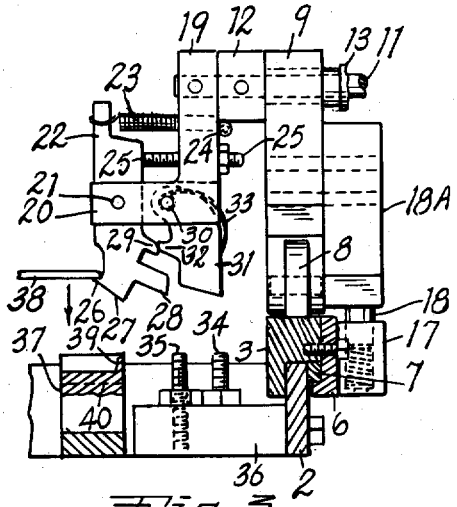
Fig. 3 is a fragmentary transverse cross sectional view taken along the plane of the line 3—3 in Fig. 2.

The side members 3 are provided with side plates 6 having flanges lapped under retaining flange 7 on the guide rails to vertically retain the carriage on the guide rails (see Fig. 3).

Each of the side members 3 of the carriage is provided with a pair of upstanding lugs 8 spaced apart approximately the distance equal to the length of the sheets to be handled. The lugs 8 project into the lower ends of the support arms 9 and the arms are pivotally connected with the lugs by pivot pins 10. The upper swinging ends of the arms 9 carry transversely extending pins 11 and the pair of pins on each side of the carriage are connected by a tie-bar 12. The arms 9 and the tie-bar 12 thus form a parallelogram on each side of the carriage. The pins 11 project to strike against a forward stop 14 and a rearward stop 15 near the ends of the travel of the carriage. The stops 14 and 15 are provided with vertically upwardly opening slots 16 so that the projecting rollers 13 will first strike one stop or the other as the carriage is moved longitudinally. Continued movement of the carriage will tilt the support arms backwardly from the direction of the motion of the carriage causing the engaged roller to drop into one of the aforesaid slots 16. Upon reverse movement of the carriage the engaged roller will first bear against the opposite side of the slot in which it is engaged so that the support arms will be raised to upright position, after which the carriage continues in longitudinal motion toward the other stop with the support arms vertical.

Figure 5:
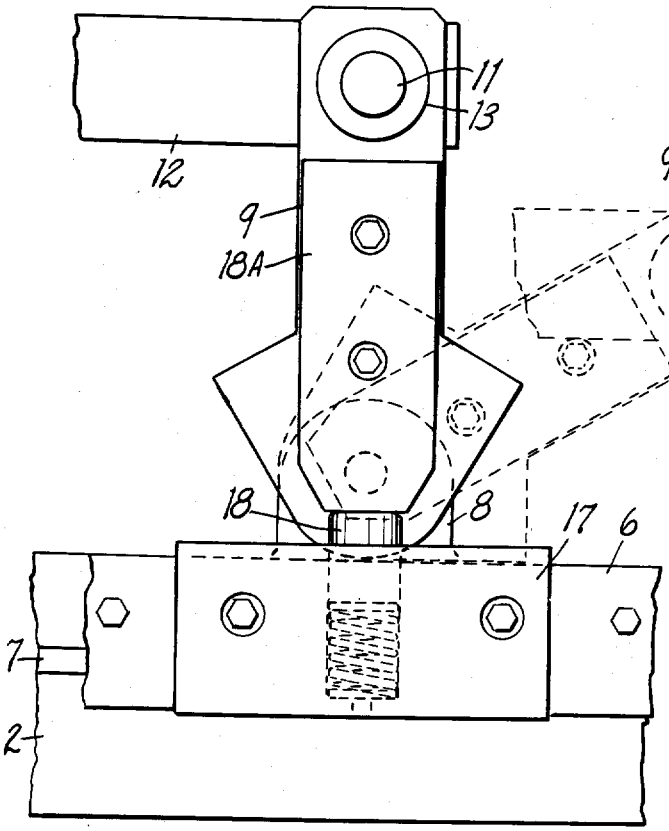
Fig. 5 is an enlarged fragmentary side elevational view of the locating detent on one of the support arms.
Figure 8:
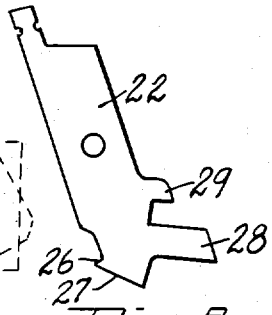
Fig. 8 is an enlarged view of the jaw in Figs. 1–7.

In order to retain the support arms in vertical position during movement between the end stops 14 and 15 the side members 3 of the carriage are provided with blocks 17 having upwardly projecting spring biased pins 18 mounted therein. The pins 18 are adapted to yieldably retainingly engage the flattened ends of the block 18A secured to one of the support arms 9, as is best illustrated in Fig. 5. The pins 18 prevent unintentional tilting of the support arms but permit desired tilting in the manner indicated by the dotted lines at 9A in Fig. 5.

Inwardly from the tie-bars 12 the pins 11 are engaged with depending hanger bars 19. The hanger bars 19 are angle shaped and have transversely inwardly projecting arms 20 with pivots 21 near the inner ends thereof. The inner ends of the arms 20 are vertically slotted to receive the gripper members 22 that are pivotally supported on the pins 21. The upper ends of the grippers are engaged by the inner ends of the tension springs 23 which extend outwardly through the upright branches of the hanger bars and are anchored in place as at pins 24. The springs 23 thus urge the grippers to upright positions and the adjustable screws 25 on the upright arms of the hangers form stops limiting rotation of the grippers.

The lower ends of the grippers 22 are provided with inwardly facing sheet engaging jaws 26 having downwardly and outwardly sloping cammed surfaces 27 therebelow. The outer sides of the grippers are provided with laterally projecting cocking ears 28 near their lower ends and outwardly and downwardly projecting locking lugs 29 thereabove.

Pivotally supported on the hangers 19 by the pivot pins 30 and outwardly from the grippers are locked members 31 having inwardly and upwardly facing locking lugs 32 adapted to coact with the locking lugs 29 on the grippers. Springs 33 urge the locking members 31 toward locking engagement with the grippers. Positioned alongside of the side rails 2 and opposite the stations at which the sheets will be supported are lock release pins 34 and gripper locking pins 35. These pins may be supported by any fixed structure adjacent the pickup and release positions of the grippers and in the present instance the pins are formed as screws mounted in support blocks 36 bolted to the insides of the guide rails 2.

Figure 4:
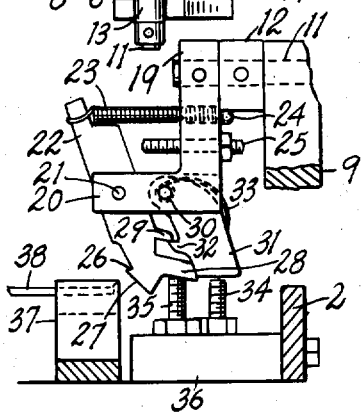
Fig. 4 is a fragmentary view illustrating the mechanism of Fig. 3 after release of the transferred sheet.

The release pins 34 are positioned to engage the locking lugs 31 when the grippers are opposite the sheet pick up station and tilt the locking lugs upwardly to release the lock 29—32. The locking pins 35 are spaced further inwardly to engage the cocking ears 28 and tilt the jaws 26 upwardly to release the transferred plate as it is lowered over the advanced work suport 37. Figs. 3 and 4 illustrate the action of the machine in releasing each successive sheet indicated at 38 and locking the grippers for snap engagement with a succeeding sheet.

Figure 6:
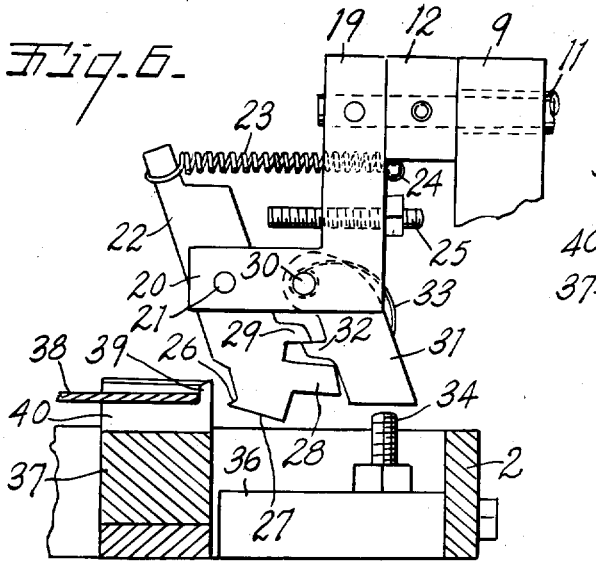
Fig. 6 is a fragmentary transverse cross sectional view taken along the plane of line 6—6 of Fig. 2 showing the sheet gripping jaws prior to engagement with a sheet.
Figure 7:
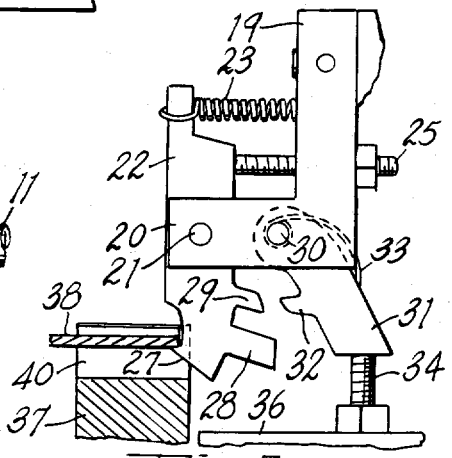
Fig. 7 is a fragmentary view illustrating the sheet gripping jaws actuated into said gripping position.

Figs. 6 and 7 illustrated the action of the release pins 34 in disengaging the gripper lock 29—32 as the grippers are lowered alongside of the work to be transferred.

Desirably the work support 37 is provided with locating flanges 39 and undercut portions 40 (see Figs. 5 and 6) to permit entry of the gripper jaws to the edges of the sheet.

Figure 9:
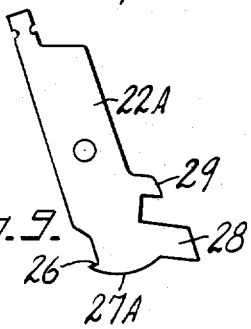
Fig. 9 is an elevational view of a modified jaw.

The use of the locking pins 35 at the discharge station is not absolutely necessary where it is convenient to provide side edges on the work supports that are engageable with the cam surfaces 27 on the lower ends of the grippers. Engagement of the cam surfaces 27 with the supports may be employed to release the sheet and move the grippers to locking engagement with the locking lugs 31. Where the nature of the work and the shape of the work supports 37 does not facilitate the use of camming engagement between the work support and the grippers and where it is impractical to undercut the work support below the sheet, the modified form of gripper shown at 22A in Fig. 9 may be employed. It will be noted that the lower end of the gripper is curved sharply away from the jaw 26 as at 27A in place of the inclined cam surface 27. In other respects the two forms of the grippers are the same.

Figure 10:
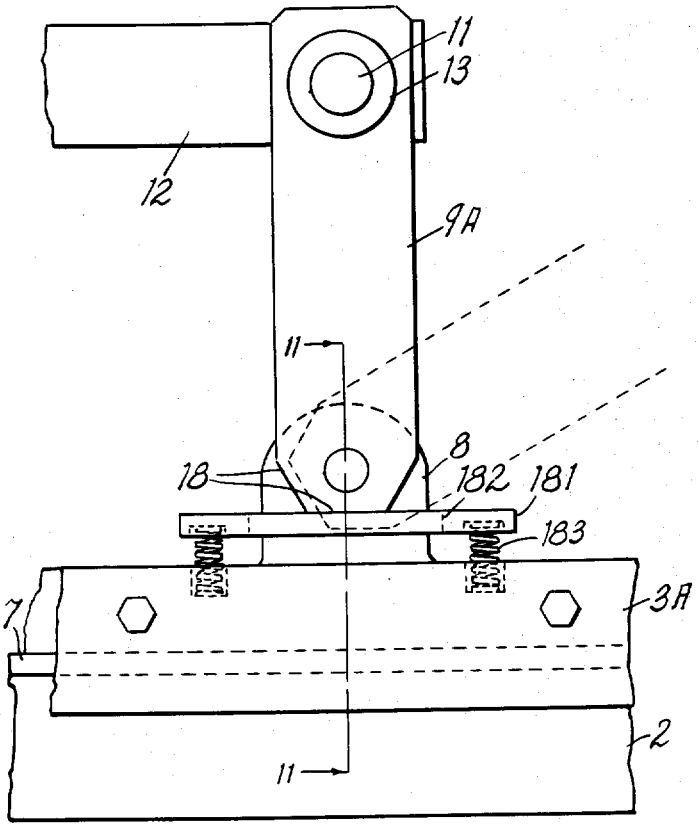
Fig. 10 is a side view of a modified arm locating detent.
Figure 11:
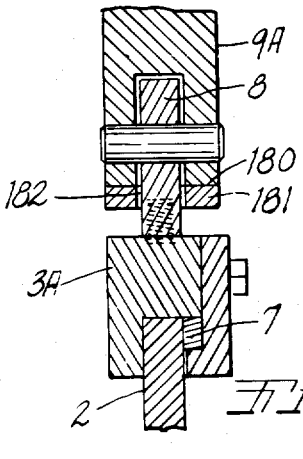
Fig. 11 is a cross sectional view on line 11—11 of Fig. 10.

The modified form of support arm locating detent shown in Figs. 10 and 11 provides the support arm 9A with straight sided locating surfaces 180 on its lower end corresponding in shape to the locating block 18 in Fig. 5. The arm 9A straddles the ear 8 on which it is pivotally supported as in Fig. 5. A pressure plate 181 is positioned under the arm 9A and has a hole 182 therein passing the ear 8. Springs 183 set into recesses in the top of the side member 3A of the carriage bear against each end of the plate 181 to yieldably lock the arm 9A in its adjusted tilted positions.

The described forms of the invention operate effectively to rapidly translate sheets from one position to another. The parts of the movable connections of the device are rugged and capable of withstanding shocks incident to operation of the device. No attempt has been made to illustrate all possible variations of modifications of the device which may follow within the scope of the following claims.

Having thus described the invention, what is claimed to be new and is desired to be secured by Letters Patent is:

1. A sheet translating device comprising spaced apart guide rails and a carriage having side members slidably supported thereon, support arms pivotally supported on the tops of said side members and tiltable longitudinally therealong, tie-bars connecting the support arms of each side of said carriage, pins projecting outwardly from said support arms, fixed stops projecting into the path of said pins near the ends of the travel of said carriage and having upwardly opening slots formed therein below and longitudinally inwardly from the stops and adapted to receive said pins as said support arms are tilted on said carriage, depending hanger members carried on the swinging ends of said support arms inwardly of said carriage and having inwardly projecting angle arms on their lower ends, grippers pivotally supported on the inner ends of said angle arms and having inwardly facing jaws on their lower ends, springs connected between the upper ends of said grippers and said hanger members to bias said jaws transversely inwardly of said carriage, locking members pivotally supported on said hanger members and yieldably biased toward said grippers, coacting locking projections on said grippers and locking members positioned to lock said grippers in jaw retracted position, cocking ears projecting laterally from the lower ends of said grippers, jaw releasing and gripper cocking pins positioned along said side rails at the discharge position of said carriage to engage and actuate said ears on said grippers, lock releasing pins positioned alongside of said side rails adjacent the pickup position of said carriage to engage and release said locking members from said grippers, and spring pressed detent means engageable between said carriage and said support arms to yieldably retain said support arms in upright and tilted positions.

2. A sheet translating device comprising spaced apart guide rails and a carriage having side members slidably supported thereon, support arms pivotally supported on the tops of said side members and tiltable longitudinally therealong, tie-bars connecting the support arms of each side of said carriage, pins projecting outwardly from said support arms, fixed stops projecting into the path of said pins near the ends of the travel of said carriage and having upwardly opening slots formed therein below and longitudinally inwardly from the stops and adapted to receive said pins as said support arms are tilted on said carriage, depending hanger members carried on the swinging ends of said support arms inwardly of said carriage, grippers pivotally supported on the lower ends of said hanger members and having inwardly facing jaws on their lower ends, springs connected between the upper ends of said grippers and said hanger members to bias said jaws transversely inwardly of said carriage, locking members pivotally supported on said hanger members and yieldably biased toward said grippers, coacting locking projections on said grippers and locking members positioned to lock said grippers in jaw retracted position, cocking ears projecting laterally from the lower ends of said grippers, jaw releasing and gripper cocking pins positioned along said side rails at the discharge position of said carriage to engage and actuate said ears on said grippers, and lock releasing pins positioned alongside of said side rails adjacent the pickup position of said carriage to engage and release said locking members from said grippers, and spring pressed detent means engageable between said carriage and said support arms to yieldably retain said support arms in upright and tilted positions.

3. A sheet translating device comprising spaced apart guide rails and a carriage having side members slidably supported thereon, support arms pivotally supported on the tops of said side members and tiltable longitudinally therealong, tie-bars connecting the support arms of each side of said carriage, pins projecting from said tie-bars, fixed stops projecting into the path of said pins near the ends of the travel of said carriage and having upwardly opening slots formed therein below and longitudinally inwardly from the stops and adapted to receive said pins as said support arms are tilted on said carriage, depending hanger members carried on the swinging ends of said support arms inwardly of said carriage, grippers pivotally supported on the lower ends of said hanger members and having inwardly facing jaws on their lower ends, downwardly and outwardly cammed surfaces on said grippers below said jaws, springs connected between said grippers and said hanger members to bias said jaws transversely inwardly of said carriage, locking members pivotally supported on said hanger members and yieldably biased toward said grippers, coacting locking projections on said grippers and locking members positioned to lock said grippers in jaw retracted position, lock releasing projections positioned alongside of said side rails adjacent the pickup position of said carriage to engage and release said locking members from said grippers, and spring pressed detent means engageable between said carriage and said support arms to yieldably retain said support arms in upright and tilted positions.

4. A sheet translating device comprising spaced apart guide rails and a carriage having side members slidably supported thereon, support arms pivotally supported on said side members and tiltable longitudinally therealong, tie-bars connecting the support arms of each side of said carriage, pins projecting from said tie-bars, fixed stops projecting into the path of said pins near the ends of the travel of said carriage and having upwardly opening slots formed therein below and longitudinally inwardly from the stops and adapted to receive said pins as said support arms are tilted on said carriage, depending hanger members carried on the swinging ends of said support arms inwardly of said carriage, grippers pivotally supported on the lower ends of said hanger members and having inwardly facing jaws on their lower ends, downwardly and outwardly cammed surfaces on said grippers below said jaws, springs connected between said grippers and said hanger members to bias said jaws transversely inwardly of said carriage, locking members pivotally supported on said hanger members and yieldably biased toward said grippers, coacting locking projections on said grippers and locking members positioned to lock said grippers in jaw retracted position, locking releasing projections positioned alongside of said side rails adjacent the pickup position of said carriage to engage and release said locking members from said grippers, and means engageable between said carriage and said support arms to yieldably retain said support arms in upright and tilted positions.

5. A sheet translating device comprising spaced apart guide rails and a carriage having side members slidably supported thereon, support arms pivotally supported on said side members and tiltable longitudinally therealong, tie-bars connecting the support arms of each side of said carriage, pins projecting from said tie-bars, fixed stops projecting into the path of said pins near the ends of the travel of said carriage and having upwardly opening slots formed therein below and longitudinally inwardly from the stops and adapted to receive said pins as said support arms are tilted on said carriage, depending hanger members carried on the swinging ends of said support arms inwardly of said carriage and having anwardly projecting angle arms on their lower ends, grippers carried on the inner ends of said angle arms and having inwardly facing jaws of their lower ends, and means carried on said carriage to move said jaws transversely inwardly of said carriage.

6. A sheet translating device comprising spaced apart guide rails and a carriage having side members slidably supported thereon, support arms pivotally supported on the sides of said carriage and tiltable longitudinally therealong, tie-bars connecting the support arms of each side of said carriage, pins projecting from said tie-bars, fixed stops projecting into the path of said pins near the ends of the travel of said carriage and having upwardly opening slots formed therein below and longitudinally inwardly from the stops and adapted to receive said pins as said support arms are tilted on said carriage, depending hanger members carried on the swinging ends of said support arms inwardly of said carriage, grippers carried on the lower ends of said hanger members and having inwardly facing jaws on their lower ends, and means carried on said carriage to move said jaws transversely inwardly of said carriage.

7. In a sheet translating device having a reciprocable carriage with longitudinally tiltable support arms on each side thereof, depending hanger members carried by the swinging ends of said arms, grippers pivotally supported on the lower ends of said hanger members, locking members pivotally supported on said hanger members and yieldably biased toward said grippers, coacting locking projections on said grippers and locking members positioned to lock grippers in jaw retracted position, cocking ears projecting laterally from the lower ends of said grippers, jaw releasing and gripper cocking pins positioned along the path of travel of said carriage at the discharge position of said carriage to engage and actuate said ears on said grippers, and lock releasing pins positioned alongside of the path of movement of said carriage adjacent the pickup position of said carriage to engage and release said locking members from said grippers.

8. In a sheet translating device having a reciprocable carriage with longitudinally tiltable support arms on each side thereof, grippers swingably connected to the swinging ends of said arms and having laterally inwardly facing jaws, locking members pivotally carried by said arms, coacting locking projections on said grippers and locking members positioned to lock said grippers in jaw retracted position, cocking ears projecting from said grippers, jaw releasing and gripper cocking pins positioned along the path of travel of said carriage at the discharge position of said carriage to engage and actuate said ears on said grippers, and lock releasing pins positioned alongside of the path of movement of said carriage adjacent the pickup position of said carriage to engage and release said locking members from said grippers.

9. A sheet translating device comprising spaced apart guide rails and a carriage having side members slidably supported thereon, support arms pivotally supported on the sides of said carriage and tiltable longitudinally therealong, tie-bars connecting the support arms on each side of said carriage, fixed stops coacting with said arms near the ends of the travel of said carriage to tilt said arms between tilted and upright positions upon reverse movements of said carriage, depending hanger members carried on the swinging ends of said support arms inwardly of said carriage, grippers pivotally supported on said hanger members and having inwardly facing jaws on their lower ends, springs connected between said grippers and said hanger members to bias said jaws transversely inwardly of said carriage, locking members pivotally supported on said hanger members and yieldably biased toward said grippers, coacting locking projections on said grippers and locking members positioned to lock said grippers in jaw retracted position, and lock releasing projections positioned alongside of said side rails adjacent the pickup position of said carriage to engage and release said locking members from said grippers.

10. A sheet translating device comprising spaced apart guide rails and a carriage having side members slidably supported thereon, support arms pivotally supported on the sides of said carriage and tiltable longitudinally therealong, means coacting with said arms near the ends of the travel of said carriage to tilt said arms between tilted and upright positions upon reverse movements of said carriage, grippers pivotally supported on swinging end of said arms and having inwardly facing jaws on their ends, springs connected to bias said jaws transversely inwardly of said carriage, locking members movably supported on said arms and yieldably biased toward said grippers, coacting locking projections on said grippers and locking members positioned to lock said grippers in jaw retracted position, and lock releasing projections positioned alongside of said side rails adjacent the pickup position of said carriage to engage and release said locking members from said grippers.

*11. A sheet translating device comprising spaced apart guide rails and a carriage having side members slidably supported thereon, support arms pivotally supported on said side members and tiltable longitudinally therealong, tie-bars connecting the support arms of each side of said carriage, pins projecting from said tie-bars, fixed stops projecting into the path of said pins near the ends of the travel of said carriage and having upwardly opening slots formed therein below and longitudinally inwardly from the stops and adapted to receive said pins as said support arms are tilted on said carriage, depending hanger members carried on the swinging ends of said support arms inwardly of said carriage, grippers pivotally supported on the lower*

*ends of said hanger members and having inwardly facing jaws on their lower ends, downwardly and outwardly cammed surfaces on said grippers below said jaws, springs connected between said grippers and said hanger members to bias said jaws transversely inwardly of said carriage, and means engageable between said carriage and said support arms to yieldably retain said support arms in upright and tilted positions.*

*12. A sheet translating device comprising spaced apart guide rails and a carriage having side members slidably supported thereon, support arms pivotally supported on the sides of said carriage and tiltable longitudinally therealong, tie-bars connecting the support arms of each side of said carriage, pins projecting from said tie-bars, fixed stops projecting into the path of said pins near the ends of the travel of said carriage and having upwardly opening slots formed therein below and longitudinally inwardly from the stops and adapted to receive said pins as said support arms are tilted on said carriage, depending grippers pivotally connected at their upper ends to said support arms and having inwardly facing jaws on their lower ends, and yieldable means carried on said carriage to bias said jaws transversely inwardly of said carriage, said grippers having downwardly and transversely outwardly cammed surfaces positioned below said jaws.*

*13. A sheet translating device comprising spaced apart guide rails and a carriage having side members slidably supported thereon for movement between pick-up and discharge positions, support arms pivotally supported on the sides of said carriage and tiltable longitudinally therealong, means connecting the support arms on each side of said carriage, stops positioned near the ends of the travel of said carriage and having vertically upwardly opening slots formed at their inner sides, projections connected to said arms engageable with the inner sides of said stops and swingable into said slots to tilt said arms between tilted and upright positions upon reverse movements of said carriage, grippers carried by said arms on each side of said carriage at spaced positions longitudinally therealong for longitudinal swinging motion with said arms, first pivots extending transversely of said carriage and pivotally connecting said grippers to said arms whereby the grippers may remain in upright position as said arms are tilted longitudinally of the carriage, other pivots extending parallel to the sides of said carriage and connecting said grippers to said arms whereby the grippers can swing transversely of the carriage, transversely inwardly facing jaws on the swinging ends of said grippers, springs connected between said grippers and said arms to bias said jaws inwardly of said carriage, downwardly and outwardly cammed surfaces on the undersides of said grippers below said jaws operative to engage the edge of a sheet to be transferred and cam the jaws of the grippers over the edges of the sheet, and fixed abutments at the sides of the discharge position of said carriage engageable with said grippers to swing the grippers on said other pivots to sheet releasing position.*

*14. A sheet translating device comprising spaced apart guide rails and a carriage having side members slidably supported thereon for movement between pick-up and discharge positions, support arms pivotally supported on the sides of said carriage and tiltable longitudinally therealong, means connecting the support arms on each side of said carriage, means coacting with said arms near the ends of the travel of said carriage to tilt said arms between tilted and upright positions upon reverse movements of said carriage, grippers carried by said arms on each side of said carriage for longitudinal swinging motion with said arms, first pivots extending transversely of said carriage and pivotally connecting said grippers to said arms whereby the grippers may remain in upright position as said arms are tilted longitudinally of the carriage, other pivots extending parallel to the sides of said carriage and connecting said grippers to said arms whereby the grippers can swing transversely of the carriage, transversely inwardly facing jaws on the swinging ends of said grippers, springs connected between said grippers and said arms to bias said jaws inwardly of said carriage, downwardly and outwardly cammed surfaces on the undersides of said grippers below said jaws operative to engage the edge of a sheet to be transferred and cam the jaws of the grippers over the edges of the sheet, and fixed abutments at the sides of the discharge position of said carriage engageable with said grippers to swing the grippers on said other pivots to sheet releasing position.*

No references cited.